Patented Jan. 13, 1925.

1,522,712

UNITED STATES PATENT OFFICE.

SIDNEY M. CADWELL, OF NEW YORK, N. Y., AND CLAUDE D. MASON, OF BLOOMFIELD, NEW JERSEY, ASSIGNORS TO THE NAUGATUCK CHEMICAL COMPANY, A CORPORATION OF CONNECTICUT.

PROCESS FOR VULCANIZING RUBBER AND PRODUCT OBTAINED THEREBY.

No Drawing.  Application filed April 16, 1920. Serial No. 374,275.

*To all whom it may concern:*

Be it known that we, SIDNEY M. CADWELL and CLAUDE D. MASON, both citizens of the United States, and residents of New York city, county of New York, and State of New York, and Bloomfield, county of Essex, State of New Jersey, respectively, have invented certain new and useful Improvements in Processes for Vulcanizing Rubber and Products Obtained Thereby, of which the following is a full, clear, and exact description.

This invention relates to processes for vulcanizing rubber and products obtained thereby. It is more particularly directed to the process for vulcanizing rubber in the presence of an organic accelerator and products obtained thereby.

It is known that the time and temperature involved in the vulcanization of rubber as herefore practiced may be regulated by the use of accelerators. The class of accelerators which has been employed in the more recent processes has included the organic accelerators and of these organic accelerators the amines and their derivatives have provided perhaps the most promising group. Of these amine derivatives the carbon disulphide derivatives have constituted the faster accelerators. Among these faster accelerators aliphatic amine carbon disulphide derivatives have appeared most promising. One disadvantage of such aliphatic amine accelerators has been that the raw materials from which they are produced are expensive and must be used in a relatively high state of purity in order to avoid the occurrence in the finished accelerator of objectionable byproducts.

The object of the present invention accordingly is to provide an efficient process comprising an accelerator which may be made from relatively inexpensive raw materials and materials which in many instances may be employed in a relatively impure condition without the presence of objectionable byproducts. Another object of the invention is to provide a simple process of vulcanization comprising an accelerator in sufficient quantity and for a length of time to provide an optimum vulcanization. Another object of the invention is to provide a process of the kind described employing an accelerator free from odor, and poisonous characteristics. Another object of the invention is to provide a series of products having improved physical characteristics in general, and also the product from a process such as that outlined above.

The invention accordingly consists in a process and product obtained thereby for treating rubber or similar material which comprises bringing together the rubber with a vulcanizing agent and a cyclic metallic dithiocarbamate, and vulcanizing the rubber.

In carrying out the invention in its preferred form, 100 parts of rubber are combined with 10 parts of zinc oxide, 3 parts of sulphur, and 3 parts of potassium orthomethylphenylenedithiocarbamate. These materials are mixed on the mill, the mixing being accomplished in the usual manner. After incorporation of the materials vulcanization may be accomplished in the usual manner, for example, in a mold under 40 lbs. steam pressure for ten minutes. Under the conditions mentioned, vulcanization is complete within the time mentioned. If desired, vulcanization may be accomplished also in open heat. The vulcanization may be prolonged to several times as long without very detrimental results, the time varying with the thickness of the rubber.

As an alternative process to the preferred procedure given, the following mixture may be employed: 100 parts of rubber, 10 parts of zinc oxide, 3 parts of sulphur, and 1 part of ammonium para-aminophenylenedithiocarbamate are mixed on the mill at the ordinary temperature for the usual time when mixing is accomplished and the material may be vulcanized in a mold or in open heat or any other desired manner. In mold cure vulcanization is satisfactorily accomplished in sixty minutes at 40 lbs. steam pressure.

The preferred method of preparation of the first accelerator described above, namely potassium orthomethylphenylenedithiocarbamate, is as follows:

One gram molecular weight of ortho toluidine is added to one gram molecular weight of carbon disulphide, and then an excess of alcoholic caustic potash is added. After a time a whitish product separates out. This is filtered off, washed with alcohol and dried. It is then ready for use.

The formula for this material is believed to be as follows:

$$o\text{-}CH_3\cdot C_6H_4\cdot NH\cdot \underset{\underset{S}{\|}}{C}\text{-}S\text{-}K$$

The preferred method of preparation of the second above mentioned accelerator is as follows: Paraphenylenediamine is dissolved in an excess of carbon disulphide. This is treated with an excess of aqueous ammonia and alcohol is added until the mixture becomes homogeneous. This is allowed to stand until the ammonium para-aminophenylenedithiocarbamate separates out as a white substance. The mixture is then filtered and the residue is washed with alcohol and dried. It is then ready for use. The formula for this material is believed to be as follows:

Ammonium para-aminophenylenedithiocarbamate:

$$pNH_2C_6H_4NH\underset{\underset{S}{\|}}{C}\text{-}S\text{-}NH_4$$

Potassium orthomethylphemylenedithiocarbamate described above is an excellent representative of a large class of materials which may be similarly employed. These substances may be represented by the following formulæ:

Potassium para-aminophenylenedithiocarbamate:

$$pNH_2C_6H_4NH\text{-}\underset{\underset{S}{\|}}{C}\text{-}SK$$

Zinc para-aminophenylenedithiocarbamate:

$$pNH_2C_6H_4NH\underset{\underset{S}{\|}}{C}\text{-}S\text{-}Zn\text{-}S\text{-}\underset{\underset{S}{\|}}{C}NHC_6H_4NH_2p$$

Ammonium benzidyldithiocarbamate:

$$H_2NC_6H_4C_6H_4NH\underset{\underset{S}{\|}}{C}\text{-}S\text{-}NH_4$$

Ammonium phenyldithiocarbamate:

$$C_6H_5NH\underset{\underset{S}{\|}}{C}\text{-}SNH_4$$

Zinc phenylaminodithiocarbamate:

$$C_6H_5NHNH\underset{\underset{S}{\|}}{C}\text{-}SZn\text{-}S\text{-}\underset{\underset{S}{\|}}{C}\text{-}NHNHC_6H_5$$

Zinc alpha napthyldithiocarbamate:

$$aC_{10}H_7NH\underset{\underset{S}{\|}}{C}\text{-}S\text{-}Zn\text{-}S\text{-}\underset{\underset{S}{\|}}{C}NHC_{10}H_7a$$

Para methylphenyleneammonium para methylphenylenedithiocarbamate:

$$pCH_3C_6H_4NH\underset{\underset{S}{\|}}{C}\text{-}SH_3NC_6H_4CH_3p$$

Ammonium meta methylaminophenyldithiocarbamate:

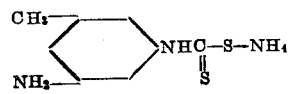

Zinc metadiaminomethylphenyldithiocarbamate:

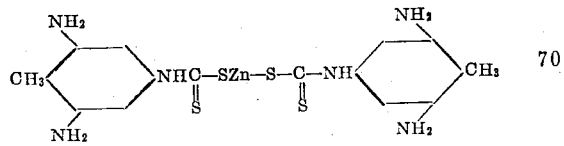

Ammonium para nitrophenylenedithiocarbamate:

$$pNO_2C_6H_4NH\underset{\underset{S}{\|}}{C}\text{-}SNH_4$$

Ammonium para methylphenylenedithiocarbamate:

$$pCH_3C_6H_4NH\underset{\underset{S}{\|}}{C}\text{-}SNH_4$$

Zinc para methylphenylenedithiocarbamate:

$$pCH_3C_6H_4NH\underset{\underset{S}{\|}}{C}\text{-}SZn\underset{\underset{S}{\|}}{S}CNHC_6H_4CH_3p$$

Ammonium ortho methylphenylenedithiocarbamate:

$$oCH_3C_6H_4NH\underset{\underset{S}{\|}}{C}\text{-}SNH_4$$

Para-aminophenyleneammonium para-aminophenylenedithiocarbamate:

$$pNH_2C_6H_4NH\underset{\underset{S}{\|}}{C}\text{-}SH_3NC_6H_4NH_2p$$

Barium orthomethylphenylenedithiocarbamate:

$$(o)CH_3C_6H_4NH\underset{\underset{S}{\|}}{C}\text{-}S\text{-}Ba\text{-}\underset{\underset{S}{\|}}{S}CNHC_6H_4CH_3(o)$$

Zinc orthomethylphenylenedithiocarbamate:

$$(o)CH_3C_6H_4NH\underset{\underset{S}{\|}}{C}\text{-}S\text{-}Zn\underset{\underset{S}{\|}}{S}CNHC_6H_4CH_3(o)$$

Ferric paramethylphenylenedithiocarbamate:

$$p\cdot CH_3C_6H_4NH\underset{\underset{S}{\|}}{C}\text{-}SFe/_3$$

Barium paramethylphenylenedithiocarbamate:

$$p\cdot CH_3C_6H_4NH\underset{\underset{S}{\|}}{C}\text{-}S\text{-}Ba/_2$$

Calcium paramethylphenylenedithiocarbamate:

$$p\cdot CH_3C_6H_4NH\underset{\underset{S}{\|}}{C}\text{-}SCa/_2$$

Magnesium ortho methylphenylenedithiocarbamate:

$$(o)CH_3C_6H_4NH\underset{\underset{S}{\|}}{C}\text{-}SMg/_2$$

Stannous paramethylphenylenedithiocarbamate:

$$p\cdot CH_3C_6H_4NH\underset{\underset{S}{\|}}{C}\text{-}SSn/_2$$

Iron phenyldithiocarbamate:

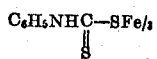

Zinc phenyldithiocarbamate:

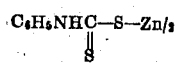

A product is formed by the combination of hexamethylenetetramine, carbondisulphide and aqueous ammonia. No attempt is made to give the formula for this compound, although since it is regarded that hexamethylenetetramine is a cyclic compound, it will be recognized that the product obtained by interaction of the materials just mentioned falls within the general group above listed.

It has been noted in connection with the specific description of the use of potassium orthomethylphenylenedithiocarbamate that the cure is effected with a relatively small proportion of the accelerator requiring only a short time for the cure to secure optimum vulcanization. The material further may be easily mixed on the mill. It may be easily manufactured at a very low cost. A majority of the members of the group given above have in general only a slight odor which is inoffensive and are non-poisonous, stable and provide rapid vulcanization. Further they mix easily with the stock on the mill. It will be recognized that variation of the properties of the accelerators may be made over a wide range by substitution of the various groups, particularly by substituting other groups in place of hydrogen in the cyclic portion of the formula for example, ammonium paramethylphenylenedithiocarbamate represents ammoniumphenyldithiocarbamate with hydrogen replaced by a methyl group and due to this replacement is a faster accelerator than the latter substance. A similar relationship exists between ammonium para-nitrophenyldithiocarbamate and ammonium phenyldithiocarbamate.

The compounds mentioned above are metallic dithiocarbamates containing a cyclic group in combination with the nitrogen, or more specifically stated, they are metallic dithiocarbamates containing an aryl group in place of one of the hydrogens of $NH_2$. In many examples this aryl group is a benzene ring or phenyl radical containing substituted groups in place of the hydrogen united to the carbon of the benzene nucleus. It is noted that these compounds are unsaturated substances.

It will be noted that in employing various members of the group as given above that vulcanization may be accomplished in a mold or in open heat or in any other desired manner.

In the above mentioned processes of compounding rubber with the various accelerators mentioned, the latter have been added to the other ingredients in the form of previously prepared and isolated compounds, but this is not the only manner in which the accelerator can be compounded with rubber, for the substances used in manufacturing the accelerators may be in many instances added separately during the compounding process with the result that they jointly act to accelerate the vulcanization apparently by combining under the conditions obtained during the milling and compounding processes to form the accelerator which in turn performs its usual accelerating function. It has also been found that the substances used in manufacturing the accelerator may be mixed prior to the compounding operation and this mixture added during the compounding and milling operations, without any previous separation or isolation of the accelerator itself. In this case, as in the former, it is likely that the accelerator is actually formed at some stage in the operation and then performs its accelerating functions. In this particular mode of procedure the accelerator may be formed before the milling operation, that is, when the ingredients used in making the accelerator are mixed, the latter may be at once formed.

As examples of the first mode of procedure just given, 100 parts rubber, 10 parts zinc oxide, 5 parts aniline, 5 parts carbon disulphide and 3 parts sulphur are mixed on the mill with the result that an acceleration of vulcanization is effected in a manner similar to the procedure when the carbon disulphide addition product with aniline is added in the compounding process. As another example may be mentioned the compounding of 100 parts rubber, 10 parts zinc oxide, 5 parts para toluidine, 5 parts carbondisulphide and 3 parts sulphur, the toluidine being either ortho or para toluidine. In this case a result is obtained similar to the result obtained when the carbon disulphide addition product or reaction product with the toluidine is first formed and then added during the compounding process. These examples illustrate the general method just described of accelerating vulcanization by the use of the ingredients going to make up the accelerator, without any previous separation or isolation of the accelerator itself. Many of the accelerators described in this case are capable of similar application, that is, the accelerator need not first be isolated and then added in the compounding process, but the ingredients going to make up the accelerator or from which the accelerator is produced may be mixed before or during the compounding process for similar results in the usual manner.

The vulcanized rubber obtained as a result of the process herein set forth is substantially odorless and colorless. It possesses excellent physical characteristics such as good tensile strength, resistance to flexing and abrasion, and excellently withstands the usual ageing tests. The quantity of sulphur employed for securing optimum vulcanization may be so small when used with accelerators of the type herein described that blooming is substantially avoided.

It will thus be seen that among others the objects heretofore noted have been achieved.

As many apparently widely different embodiments of this invention may be made without departing from the spirit thereof, it will be understood that we do not intend to limit ourselves to the specific embodiment herein set forth except as indicated in the appended claims.

Having thus described our invention, what we claim and desire to protect by Letters Patent is:

1. The process for treating rubber or similar materials comprising combining it with a vulcanizing agent and a cyclic metallic dithiocarbamate, and vulcanizing the rubber.

2. The process for treating rubber or similar materials comprising combining it with a vulcanizing agent and an aryl metallic dithiocarbamate, and vulcanizing the rubber.

3. The process for treating rubber or similar materials comprising combining it with a vulcanizing agent and a metallic dithiocarbamate containing a benzol ring substituted for a hydrogen, and vulcanizing the rubber.

4. A process for treating rubber or similar material which comprises combining rubber with a vulcanizing agent and a material having the formula otho $$CH_3-C_6H_4-NH-\underset{\underset{S}{\|}}{C}-S-K,$$

and vulcanizing the rubber.

5. A process for treating rubber which comprises subjecting the rubber to a vulcanizing agent and a substance representing the reaction product of an aromatic amine, carbon disulphide, and a strong base, and vulcanizing the rubber.

6. A process for treating rubber which comprises subjecting the rubber to a vulcanizing agent and a substance representing the reaction product of orthotoluidine, carbondisulphide and alcoholic potash, and vulcanizing the rubber.

7. Vulcanized rubber derived from rubber combined with a cyclic metallic dithiocarbamate.

8. A vulcanized rubber derived from rubber combined with a substance having the formula ortho $$CH_3-C_6H_4-NH-\underset{\underset{S}{\|}}{C}-S-K.$$

9. A vulcanized rubber derived from rubber combined with a substance representing the reaction product of an aromatic amine, carbon disulphide, and a strong base.

Signed at New York city, New York, this 13th day of April, 1920.

SIDNEY M. CADWELL.
CLAUDE D. MASON.